United States Patent
Kimura

(10) Patent No.: US 9,635,235 B2
(45) Date of Patent: Apr. 25, 2017

(54) COMMUNICATION APPARATUS AND CONTROL METHOD THEREOF

(71) Applicant: CANON KABUSHIKI KAISHA, Tokyo (JP)

(72) Inventor: Masahiko Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 14/791,849

(22) Filed: Jul. 6, 2015

(65) Prior Publication Data

US 2016/0014322 A1 Jan. 14, 2016

(30) Foreign Application Priority Data

Jul. 8, 2014 (JP) .................. 2014-140864

(51) Int. Cl.
| | |
|---|---|
| *H04N 5/232* | (2006.01) |
| *H04N 5/225* | (2006.01) |
| *H04N 1/00* | (2006.01) |
| *H04N 7/18* | (2006.01) |

(52) U.S. Cl.
CPC .......... *H04N 5/23206* (2013.01); *H04N 1/00* (2013.01); *H04N 5/2258* (2013.01); *H04N 5/23245* (2013.01); *H04N 5/23293* (2013.01); *H04N 7/18* (2013.01); *H04N 7/185* (2013.01)

(58) Field of Classification Search
CPC .. H04N 5/23206; H04N 7/18; H04N 5/23293; H04N 1/00; H04N 5/23245; H04N 5/2258
USPC .......................................... 348/211.1–211.4
See application file for complete search history.

(56) References Cited

U.S. PATENT DOCUMENTS

| | | | | | |
|---|---|---|---|---|---|
| 2011/0298886 | A1* | 12/2011 | Price | .................... | H04N 5/2351 348/14.08 |
| 2013/0329100 | A1* | 12/2013 | Desai | ................... | H04N 5/2258 348/262 |
| 2014/0063174 | A1* | 3/2014 | Junuzovic | ............ | G06Q 10/101 348/14.02 |
| 2014/0307101 | A1* | 10/2014 | Cobb | ....................... | H04N 5/45 348/169 |
| 2015/0026019 | A1* | 1/2015 | Lekas | .................. | G06Q 10/087 705/28 |

(Continued)

FOREIGN PATENT DOCUMENTS

| | | |
|---|---|---|
| JP | 2004-096166 A | 3/2004 |
| JP | 2005-184230 A | 7/2005 |

*Primary Examiner* — Yogesh Aggarwal
(74) *Attorney, Agent, or Firm* — Cowan, Liebowitz & Latman, P.C.

(57) ABSTRACT

A communication apparatus having a first image capturing unit and a second image capturing unit that is different from the first image capturing unit, comprises a communication unit which communicates with an external image capturing apparatus and a switching unit which switches an image capturing mode. When communication with the external image capturing apparatus is not established, the switching unit switches between a first mode in which an image is captured by controlling the first image capturing unit and a second mode in which an image is captured by controlling the second image capturing unit, and when communication with the external image capturing apparatus is established, the switching unit switches between the first mode and a third mode in which an image is captured by remotely controlling the external image capturing apparatus.

16 Claims, 11 Drawing Sheets

(56) References Cited

U.S. PATENT DOCUMENTS

2015/0215576 A1\* 7/2015 Pavlov .................. H04N 7/147
 348/14.03

\* cited by examiner

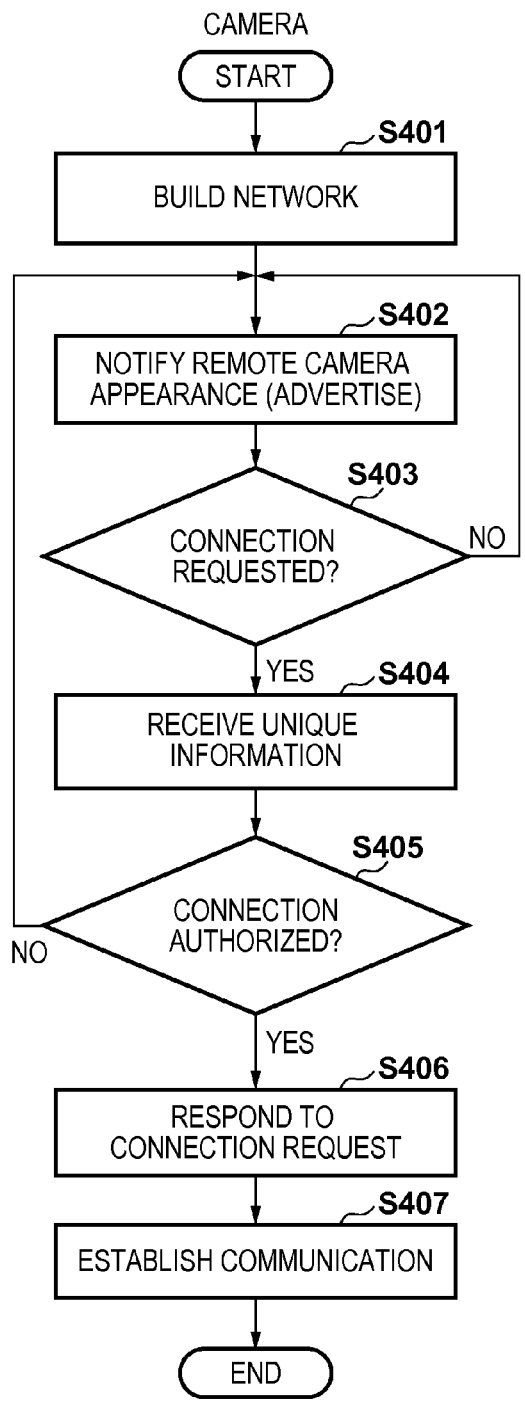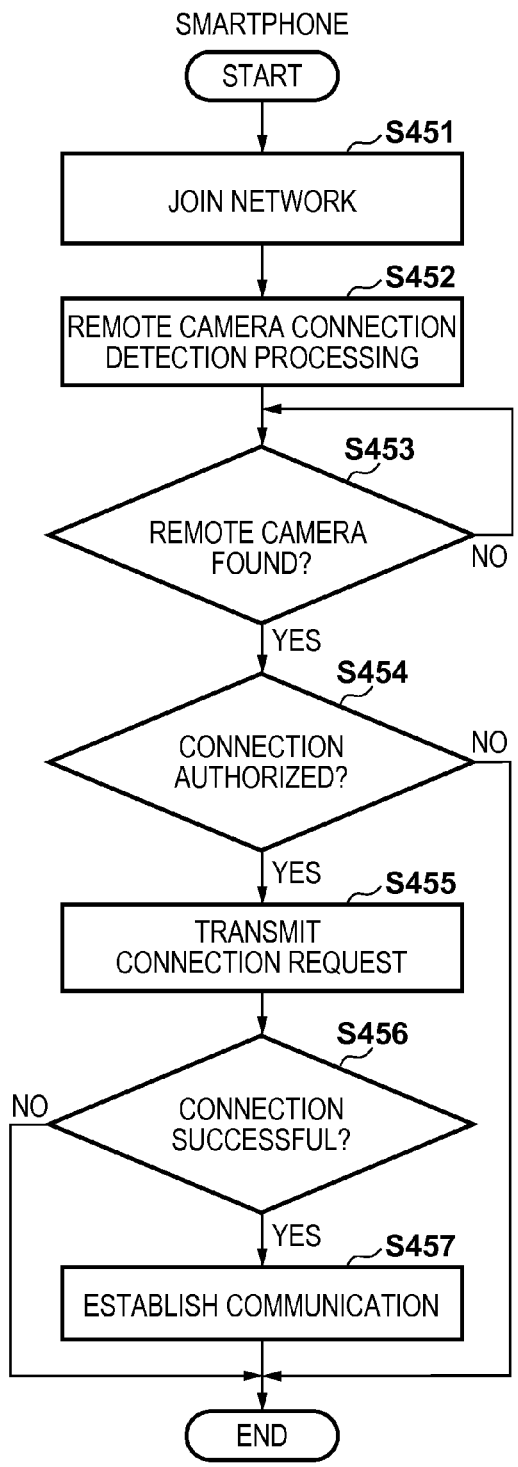

COMMUNICATION APPARATUS AND CONTROL METHOD THEREOF

BACKGROUND OF THE INVENTION

Field of the Invention

The present invention relates to a technique for remotely controlling an external image capturing apparatus using a communication apparatus.

Description of the Related Art

Recent communication apparatuses such as mobile phones, and smartphones which are a kind of mobile phone are equipped with, in addition to an ordinary camera (rear camera) for shooting a subject on the subject side, a camera (front camera) for shooting the photographer him- or herself or a subject on a photographer side. A user of the communication apparatus can shoot images suitably for different shooting situations and the like by switching between use of the rear camera and the front camera.

Additionally, a technique of using a communication function of a mobile phone to connect not only a camera built-in the mobile phone but also another camera, and perform remote control (Japanese Patent Laid-Open No. 2004-096166) and a technique in which the convenience of shooting with a mobile phone is improved by a user switching between a plurality of cameras (Japanese Patent Laid-Open No. 2005-184230) are known.

However, in many cases, in a conventional communication apparatus, control of built-in cameras such as a rear camera and a front camera, and control of an external camera that is remotely controlled are performed independently, and a dedicated camera application needs to be activated when the external camera is to be used. Accordingly, in some cases, a user cannot smoothly switch between the cameras to be controlled. Moreover, although a built-in camera is scarcely used when using an external camera, the operation of switching between cameras is complicated and inconvenient.

SUMMARY OF THE INVENTION

The present invention has been made in consideration of the aforementioned problems, and realizes a shooting control technique that makes it possible to automatically switch from a built-in camera to an external camera.

In order to solve the aforementioned problems, the present invention provides a communication apparatus having a first image capturing unit arranged on a first face and a second image capturing unit arranged on a second face that is different from the first face, comprising: a communication unit configured to communicate with an external image capturing apparatus; and a switching unit configured to switch an image capturing mode, wherein in a case where communication with the external image capturing apparatus performed by the communication unit is not established, the switching unit switches between a first mode in which an image is captured by controlling the first image capturing unit and a second mode in which an image is captured by controlling the second image capturing unit, and in a case where communication with the external image capturing apparatus performed by the communication unit is established, the switching unit switches between the first mode and a third mode in which an image is captured by remotely controlling the external image capturing apparatus.

In order to solve the aforementioned problems, the present invention provides a control method of a communication apparatus comprising a first image capturing unit arranged on a first face, and a second image capturing unit arranged on a second face that is different from the first face, the method comprising: a communication step of communicating with an external image capturing apparatus; and a switching step of switching an image capturing mode, wherein in the switching step, switching between a first mode for capturing an image by controlling the first image capturing unit and a second mode for capturing an image by controlling the second image capturing unit is performed in a case where communication with the external image capturing apparatus is not established, and switching between the first mode and a third mode for capturing an image by remotely controlling the external image capturing apparatus is performed in a case where communication with the external image capturing apparatus is established.

According to the present invention, the automatic switching from the built-in camera to the external camera allows a user to use cameras separately without a complex switching operation and to shoot images suitable for different shooting situations.

Further features of the present invention will become apparent from the following description of exemplary embodiments (with reference to the attached drawings).

BRIEF DESCRIPTION OF THE DRAWINGS

FIGS. 4A-4B are flowcharts showing processing for connecting a digital camera and a smartphone according to a first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A system in which a smartphone that is a kind of a mobile phone and a digital camera are applied respectively as a communication apparatus according to the present invention and as an external image capturing apparatus and connected via a network will be described. Note that in the present embodiment, the digital camera is assumed as an external image capturing apparatus, but the present invention is not limited thereto, and is applicable to, for example, a camera-equipped mobile phone and smartphone, a tablet terminal, a personal computer having a WEB camera, a stationary image capturing apparatus such as a monitoring camera, and the like.

Configuration of Digital Camera 100

The configuration and functions of a digital camera 100 according to this embodiment of the present invention will be described below with reference to FIG. 1.

Figure 1:
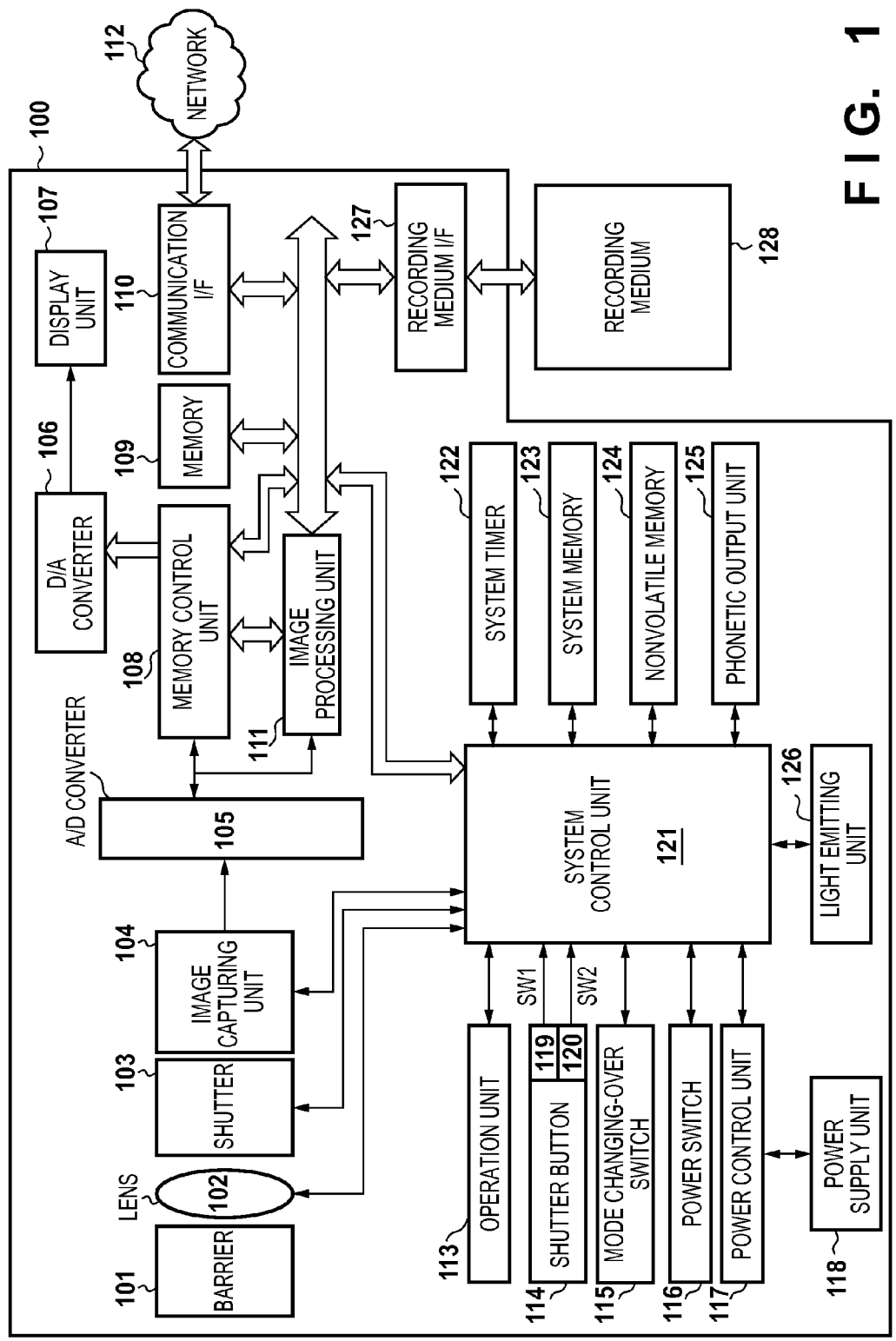
FIG. 1 is a block diagram showing a configuration of a digital camera according to a first embodiment.

In FIG. 1, a photographing lens 102 is a lens group including a zoom lens and a focusing lens. A shutter 103 has a diaphragm function. An image capturing unit 104 is an image sensor, which is constituted by a CCD or CMOS or the like, for converting the optical image of a subject to an electric signal. An A/D converter 105 converts an analog signal to a digital signal. The A/D converter 105 is used to convert an analog signal, which is output from the image capturing unit 104, to a digital signal. A barrier 101 covers the image capturing system (which includes the photographing lens 102) of the digital camera 100, thereby preventing contamination of and damage to the image capturing system that includes the photographing lens 102, shutter 103 and image capturing unit 104.

An image processing unit 111 performs resizing processing, such as predetermined pixel interpolation and reduction, and color conversion processing, with respect to data from the A/D converter 105 or data from a memory control unit 108. Further, the image processing unit 111 performs predetermined calculation processing using the captured image data, and a system control unit 121 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 111 performs predetermined calculation processing using the captured image data, and AWB (Automatic White Balance) processing of TTL type is performed on the basis of the calculation results.

The data from the A/D converter 105 is directly written into a memory 109 via both the image processing unit 111 and the memory control unit 108 or via the memory control unit 108. The memory 109 stores the image data obtained from the image capturing unit 104 and converted into digital data by the A/D converter 105, and image display data to be displayed on a display unit 107. The memory 109 has a storage capacity that is sufficient for storing a predetermined number of still images as well as moving images and audio for a predetermined time period.

The memory 109 also functions as a memory for image display (video memory). A D/A converter 106 converts the image display data stored in the memory 109 into an analog signal and supplies the display unit 107 with the analog signal. The image display data that was written into the memory 109 is displayed by the display unit 107 via the D/A converter 106. The display unit 107 performs, on a display device such as an LCD, display in accordance with the analog signal from the D/A converter 106. The digital signals once converted by the A/D converter 105 and stored in the memory 109 are converted into analog signals by the D/A converter 106, and the analog signals are successively transmitted to the display unit 107 so as to be displayed thereon, making it possible to realize an electronic view finder (EVF) functionality and to perform through image display (live view display). Note that the through image is rephrased into a live view image, and the through image display is rephrased into a live view.

A nonvolatile memory 124 is, for example, an EEPROM, which is electrically erasable and recordable. In the nonvolatile memory 124, constants and programs, for example, for operating the system control unit 121 are stored. In this context, "programs" may refer to programs for executing various flowcharts that will be described later in this embodiment.

The system control unit 121 is a calculation processing device for overall controlling the entire camera 100, and realizes, by executing the programs stored in the nonvolatile memory 124, the procedures of the flowchart that will be described later. The system memory 123 is, for example, a RAM and used also as a work memory where constants and variables for operating the system control unit 121, and the programs read out from the nonvolatile memory 124 are expanded. The system control unit 121 controls the memory 109, the D/A converter 106, the display unit 107, and the like, so as to perform display control.

A system timer 122 is a timer circuit for measuring time periods for various types of controls and the time of an built-in clock.

A mode changing-over switch 115, a first shutter switch 119, a second shutter switch 120, and operation units 113 are operation members for inputting various types of instructions into the system control unit 121.

The mode changing-over switch 115 switches the operation mode of the system control unit 121 to any of a still image shooting mode, a moving image recording mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode changing-over switch 115, the mode is directly switched to any of the plurality of modes included in the still image shooting mode. Alternatively, it is also possible to switch, using the mode changing-over switch 115, to the still image shooting mode and then to switch, using another operation member, to any of the plurality of modes included in the still image shooting mode. Similarly, also the moving image recording mode may include a plurality of modes.

While the shutter button 114 provided on the camera 100 is being operated, that is, pressed half-way (a shooting preparation instruction), the first shutter switch 119 is turned on and generates a first shutter switch signal SW1. Upon receiving the first shutter switch signal SW1, the system control unit 121 causes the camera 100 to start the AF processing, the AE processing, the AWB processing, the EF processing and the like.

When the operation of the shutter button 114 is completed, that is, the shutter button 114 is pressed fully (a shooting instruction), the second shutter switch 120 is turned on and generates a second shutter switch signal SW2. Upon receiving the second shutter switch signal SW2, the system control unit 121 starts a series of shooting processing from reading out the signal from each of the image capturing unit 104 to writing of image data to a recording medium 128.

By selecting various functional icons displayed on the display unit 107, appropriate functions for each situation are assigned to each operation member of the operation units 113, and the operation members thus act as various function buttons. Examples of these function buttons include an end button, a back button, an image scrolling button, a jump button, a narrow-down button, an attribute change button.

For example, a menu screen that enables various settings to be made is displayed on the display unit 107 by pressing a menu button. A user can make various settings intuitively by using the menu screen, which is displayed on the display unit 107, four-direction (up, down, left, right) buttons and a SET button.

A power control unit 117 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 117 controls the DC-DC converter in accordance with the detection results and an instruction of the system control unit 121, and supplies a necessary voltage for a necessary length of time to each of the units including the recording medium 128.

A power supply unit 118 comprises a primary battery such as an alkaline battery or a lithium battery, a secondary battery such as an NiCd battery, an NiMH battery, or an Li-ion battery, or an AC adaptor.

The recording medium interface (I/F) 127 is for interfacing with the recording medium 128 which may be a memory card or hard disk. The recording medium 128 is a recording medium such as a memory card for recording shot images, and constituted by a semiconductor memory, a magnetic disk, or the like.

A communication interface 110 performs transmitting/receiving video and sound to/from an external apparatus communicably connected to a network 112 such as the Internet. As the communication interface 110, a wireless interface such as wireless LAN and Bluetooth (registered), and a wired interface such as USB (Universal Serial Bus), can be used. The communication interface 110 can transmit an image (including a live-view video image) captured by the image capturing unit 104 and an image file recorded in the recording medium 128 to an external apparatus, and receive image data and other various kinds of information from an external apparatus, via the network 112.

Note that, as described later, although the digital camera 100 of this embodiment is a kind of an access point (hereinafter, referred to as AP), the digital camera 100 can operate as a simplified AP (hereinafter, referred to as simple AP) with further limited functions, by operating the communication interface 110 in an AP mode. When the digital camera 100 operates as a simple AP, the digital camera 100 forms a network by itself. Apparatuses in the periphery of the digital camera 100 recognize the digital camera 100 as an AP device, and are enabled to participate in the network formed by the digital camera 100.

A phonetic output unit 225 includes a loudspeaker which pronounces the count-down sound of a self-timer, shutter sounds in synchronism with opening/closing of a shutter, other operation sounds, the sound of a moving image when it is reproduced, and the like.

A light emitting unit 126 includes an LED (light emitting diode) and the like. The light emitting unit 126 includes a flash function for notifying a subject of the operating state (for example, a self-timer countdown, shooting start/end, and so on) of the digital camera 100 based on a predetermined light-emitting/non-light-emitting pattern, and for emitting a flash for illuminating the subject. The light emitting unit 126 is arranged on the front surface of the camera (a subject side, an image sensing plane side) so as to be visible from the subject side.

Configuration of Smartphone 200

Next, the configuration and functions of a smartphone 200 according to this embodiment of the present invention will be described below with reference to FIG. 2.

The smartphone 200 of the present embodiment has substantially the same configuration and functions as the digital camera 100 described above. Accordingly, in FIG. 2, the components similar to those of the digital camera 100 are denoted by reference numerals with "2" as their third digit (numbers from 200), and a description will be given with a focus on differences from the digital camera 100.

Note that in the present embodiment, a smartphone is used as a communication apparatus, but the present invention is not limited thereto, and it is possible to use, for example, a digital camera, a mobile media player, or an information processing apparatus such as a tablet terminal or a personal computer, with a wireless function.

The smartphone 200 of the present embodiment can execute various functions by an application being installed. Some camera applications for a smartphone provide a function for enabling remote control of a commercially available digital camera, and the smartphone 200 has a camera application installed therein for remotely controlling the digital camera 100. Note that the camera application can be installed in advance before shipping the smartphone 200, or installed by a user operation after the purchase of the smartphone 200.

The smartphone 200 of the present embodiment includes a phonetic input unit 229 such as a microphone, thereby enabling conversation with the user of another communication device via the phonetic output unit 225 and the phonetic input unit 229.

A communication interface 210 transmits/receives sound data via a telephone line, thereby enabling communication.

Furthermore, the smartphone 200 has a single camera module (hereinafter, "rear camera") built therein, which comprises a barrier 201, a photographing lens 202, a shutter 203 and an image capturing unit 204, and is attached as a rear camera to a case surface opposite a display unit 207. The rear camera is mainly used by the user holding the smartphone 200 to shoot another subject.

In a nonvolatile memory 224, constants, programs, camera applications and so on for operating the system control unit 221 are stored. Note that the nonvolatile memory 224 stores programs for communicating with the digital camera 100 that will be described later with reference to FIG. 4 and the programs are assumed to have been installed as a camera application. Note that the camera control by the smartphone 200 of the present embodiment is realized by reading out the programs provided by the camera application. Note that it is assumed that the camera application has a program for utilizing a basic function of an operating system installed in the smartphone 200. Note that the operating system of the smartphone 200 may have a program for realizing the processing in the present embodiment.

An operation unit 213 includes a touch panel capable of detecting a touch operation on the display unit 207, and then a GUI can be constructed that makes it possible for the user to directly manipulate the screen displayed on the display unit 207. A system control unit 221 detects a touch operation by the user on the touch panel and performs processing in accordance with the touch position. The touch panel may employ a method that relies upon any of the following: resistive film, electrostatic capacitance, surface acoustic waves, infrared radiation, electromagnetic induction, image recognition and optical sensing.

The system control unit 221 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the system control unit 221 and, based upon the information thus communicated, the system control unit 221 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when a "touch-up" is performed following a regular "move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 221 can determine that a "flick" has been performed when it detects such movement over a predetermined distance or greater and at a predetermined speed or greater and then detects a "touch-up". Further, the system control unit 221 can determine that a "drag" has been performed if it detects a movement over a predetermined distance or greater at a speed less than a predetermined speed.

Shooting Method

Next, shooting methods using the smartphone 200 assumed in the present embodiment will be described with reference to FIGS. 3A to 3D.

Figure 3A:
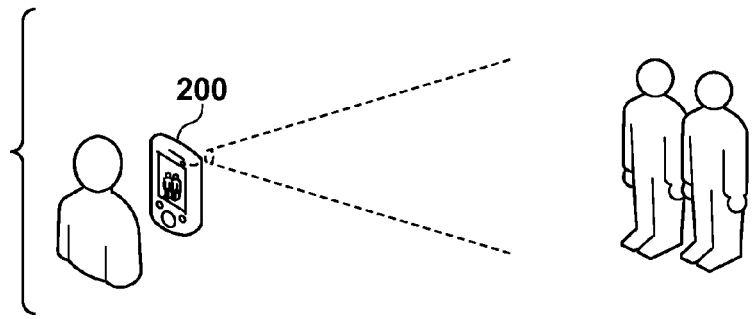
FIGS. 3A-3D are diagrams illustrating an image shooting method using a smartphone according to a first embodiment.

FIG. 3A shows a shooting method using the image capturing unit 204 (rear camera) of the smartphone 200, and shows a state in which on the display unit 207, the live-view video image of a subject in the direction opposite the display unit 207 visible to the user holding the smartphone 200 is displayed. This state is considered the most common shooting method using the smartphone 200.

Figure 3B:
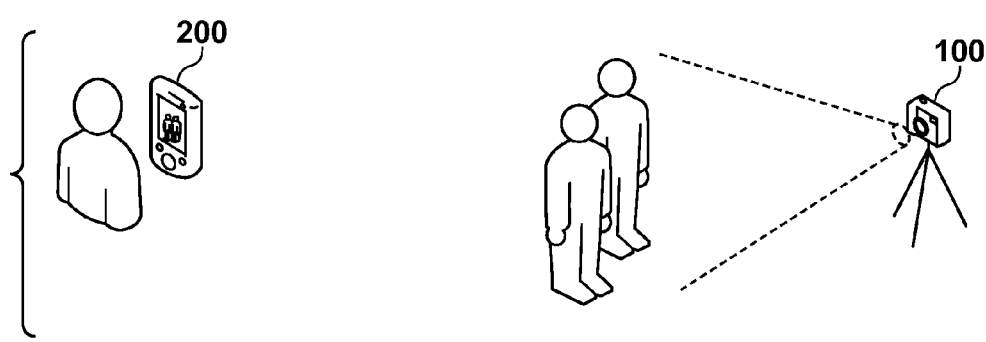

FIG. 3B shows a state in which the smartphone 200 communicates with the digital camera 100 via communication interfaces 110, 210 and remote shooting is performed by remotely controlling the image capturing unit 104 of the digital camera 100. In an example of FIG. 3B, on display unit 207, the live-view video image being captured by the digital camera 100 is displayed. The user can remotely control the shooting by transmitting a control command to the digital camera 100 through the operation of the smartphone 200. This state is assumed to be used mainly in a use case of conventional shooting performed using a self-timer function, for example, during commemorative photographing.

Figure 3C:
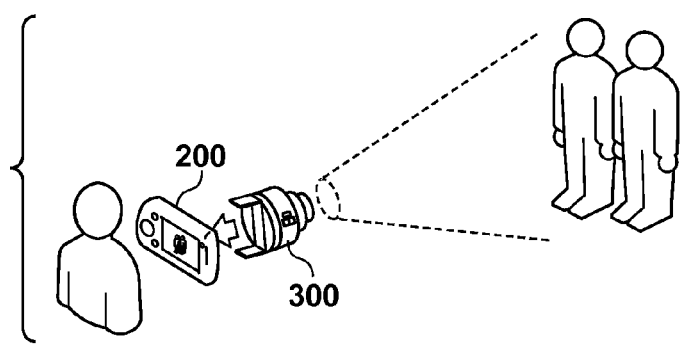

FIG. 3C shows a state of performing image capture with a camera unit 300 mounted on the smartphone 200. The smartphone 200 can have, mounted in the casing on its rear camera side, the camera unit 300 including a highly functional lens, a sensor, an image processing unit and the like, and performs various types of display and operations while performing wireless communication with the camera unit 300. In this case, the camera unit 300 and the smartphone 200 make up a remote control system via the communication interfaces 110, 210, and thus there is no significant difference from the case of FIG. 3B in terms of the communication type. In the present embodiment, unless otherwise specified, the concepts of "remote control", "remote shooting", and the like include a case such as that shown in FIG. 3C. Also, the camera unit 300 will be described as a type of "remote camera". In the case where shooting is performed with the camera unit 300 mounted, the user can perform shooting as if he is using a highly functional rear camera. Note that a shooting method using a highly functional remote camera instead of the rear camera built-in the smartphone 200 is used in many cases.

Communication Connection Processing

Next, the connection processing of the digital camera 100 operating as a remote camera and the smartphone 200 used as a remote control will be described with reference to FIGS. 4A to 4B. In the present embodiment, as a connection type in accordance with wireless LAN standards of IEEE 802.11, a case where the digital camera 100 operates as a simple AP and the smartphone 200 can participate in the network formed by the digital camera 100 will be described.

FIG. 4A shows the operation of the digital camera 100, and FIG. 4B shows the operation of the smartphone 200. Note that as for the digital camera 100 and the smartphone 200, the processing in FIGS. 4A to 4B is realized by reading out the programs recorded in the nonvolatile memories 124, 224 into system memories 123, 223 such that the system control units 121, 221 execute the programs.

Upon receiving from the user an instruction for starting communication connection with an external device via an operation unit 113, the digital camera 100 builds a network in step S401.

In step S402, on the network built in step S401, a discovery protocol such as UPnP (Universal Plug and Play) is used to advertise services to control points as a camera device on the network.

With the smartphone 200, in step S451, a network is joined by the user selecting the network built by the digital camera 100 via the operation unit 213 in step S401. If the network is successfully joined, a camera application as described below will be activated to perform camera detection processing. In step S452, the camera application uses discovery to detect the camera device advertised in step S402.

If the camera device is found in step S453, device-unique information that enables specification of the found camera device is displayed on the display unit 207, and in step S454, the user is prompted to confirm that this is the camera for which a connection request was made and to authorize the connection. When the connection is authorized in step S454, the connection request is transmitted to the digital camera 100 in step S455.

The processing of step S402 is performed in the digital camera 100 until it receives the connection request from the smartphone 200 in step S403, and in step S404, the digital camera 100 confirms the unique information of the smartphone 200 that made the connection request. If the connection is authorized in step S405, a response to the connection request is made in step S406 and the connection is established in step S407.

Upon receiving the response from the digital camera 100 in step S406, the smartphone 200 detects connection success in step S456 and enters a communication state in step S457.

As such, in step S454 performed by the smartphone 200 and step S405 performed by the digital camera 100, a procedure in which the unique information of each connection partner is displayed for the user's authorization is called "pairing". When pairing is achieved, the digital camera 100 and smartphone 200 store connection setting information enabling individual identification, such as setting of APs and ID and MAC address of the smartphones 200, which is the connection partner, and register it as external device connection settings. Authorization for reconnection is performed automatically without asking the user for confirmation.

Description of Camera Application

Next, the camera application activated by the smartphone 200 of the present embodiment will be described with reference to FIGS. 5A to 5B.

Figure 5A:
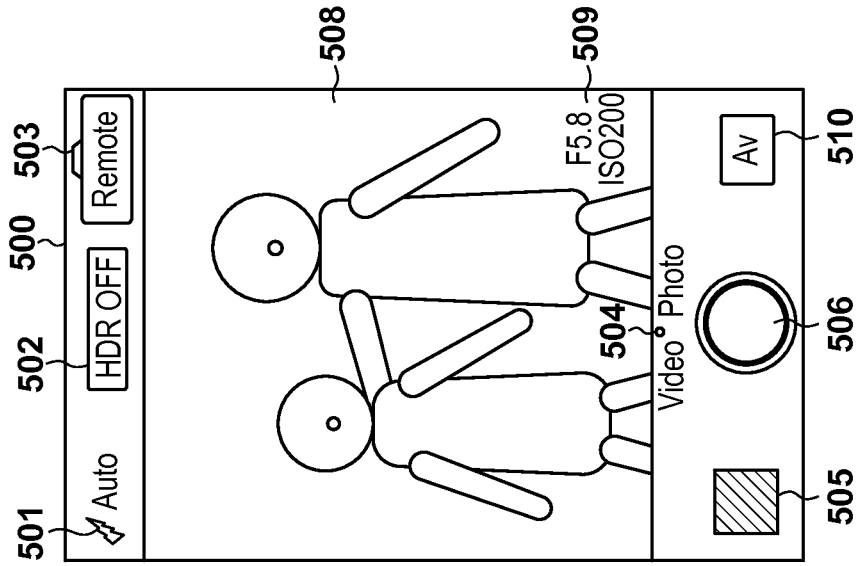
FIGS. 5A-5B are diagrams illustrating a camera application screen of a smartphone according to a first embodiment.

FIG. 5A shows an application screen (camera control screen) in a state where no connection with the digital camera 100 has been made.

A GUI screen 500 is displayed on the display unit 207 when the camera application is activated. The GUI screen 500 includes various types of operation units, and the user can instruct the execution of various types of processing by touching a desired operation unit.

A flash icon 501 indicates a control state of the flash during image shooting. The user can change the operation of a light emitting unit 226 by touching the flash icon 501. The user can change the operation to mandatory light emission, no light emission, red-eye-correcting light emission, slow synchronization light emission, and the like, as types of flash control. Note that, for example, in the case where the flash is attached to the rear camera of the smartphone 200, when the flash cannot be controlled because of the front camera being currently in operation, the flash control is not performed during shooting by the rear camera. On the other hand, as another function, the flash itself can be operated as a flash light (torch) function.

A controlled object camera icon 503 displays a camera that is a controlled object.

In the currently operating image capturing unit 104 or image capturing unit 204, a shooting mode icon 504 can be switched to shooting modes such as moving image, still image, square and panorama. The screens of the respective shooting modes can be changed by a left or right "flick" operation.

With a shooting start button 506, processing in accordance with the shooting mode, for example, an instruction to start or stop recording of a moving image, or to shoot a still image can be performed on a currently displayed video image by tapping the operation unit 213. Furthermore, if the button is held down in a still image mode, processing for performing consecutive shooting and the like is executed. Moreover, at the time of the start of shooting, the system control unit 221 outputs a shutter sound via the phonetic output unit 225.

A reproduction mode switching button 505 is updated with a captured image as an icon thereof. When the user taps on the button, the screen on which a moving image and a still image recorded in the past can be viewed is displayed.

A live-view screen 508 displays a so-called live-view video image obtained by the rear camera. At a location where the operation unit 213 is tapped, the system control unit 221 can drive the lens 202 so as to focus.

Figure 5B:
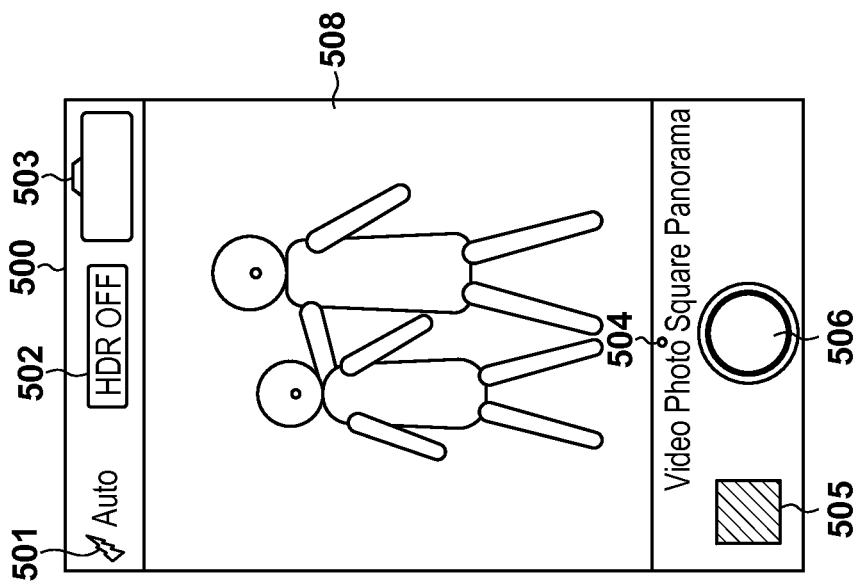

Note that "the camera that is the controlled object" in the present embodiment means a camera that is mainly controlled by operating the GUI screens 500 shown in FIGS. 5A to 5B.

With respect to the controlled object camera, it is possible to change settings using the flash icon 501 to output a shooting instruction to the rear camera, to transmit a shooting instruction command to the remote camera, and to transmit a command for obtaining a live-view video image, using the shooting start button 506, for example.

FIG. 5B shows the application screen in the case where connection with the digital camera 100 has been established.

In the case where the controlled object of the camera application is the rear camera shown in FIG. 5A, when the connection with the digital camera 100 (referred to as "remote camera" below) that can communicate through the procedures of FIGS. 4A to 4B is established, the GUI screen 500 is automatically changed from FIG. 5A to FIG. 5B, and the controlled object of the camera application is automatically switched to "remote camera".

In the GUI screen 500 of FIG. 5B, the controlled object camera icon 503 is changed to a display indicating that the controlled object camera has been switched to "remote camera", and the live-view screen 508 is changed to a live-view video image obtained by the remote camera. A parameter icon 510 is an operation unit for setting, by a remote operation, a highly functional shooting parameters of the remote camera, which cannot be realized with the rear camera, and this icon is displayed automatically when the remote camera is switched to. The user can change shooting modes, such as program mode, shutter speed priority, diaphragm priority, and manual mode, and change the settings of shooting parameters such as a shutter speed value, a diaphragm value, an ISO sensitivity value, and an exposure correction value using the parameter icon 510.

The current shooting parameters of the remote camera are displayed by superimposing them on the live-view video image in the same manner as control information 509, or the like so that the user can see the setting values.

Further, in the case where shooting with the remote camera ends and the digital camera 100 is turned off or cutoff of communication is instructed, the display returns to the camera application screen in which the rear camera is set as the controlled object shown in FIG. 5A.

In accordance with the present embodiment, in the case where the remote camera is preferred as the controlled object of the camera application, by establishing connection with the remote camera through the procedures in FIGS. 4A to 4B, the camera application automatically switches the controlled object camera to the remote camera. Furthermore, when the camera application detects a disconnection of the communication after the shooting ends, it automatically switches the controlled object camera to the rear camera built-in the smartphone 200.

Camera Control

Next, the control processing of the rear camera and the remote camera performed by the camera application of the smartphone 200 of the present embodiment will be described.

Shooting Control of Rear Camera

First, processing in which shooting is performed with the rear camera set as the controlled object in the camera application will be described with reference to FIG. 6A.

Figure 6A:
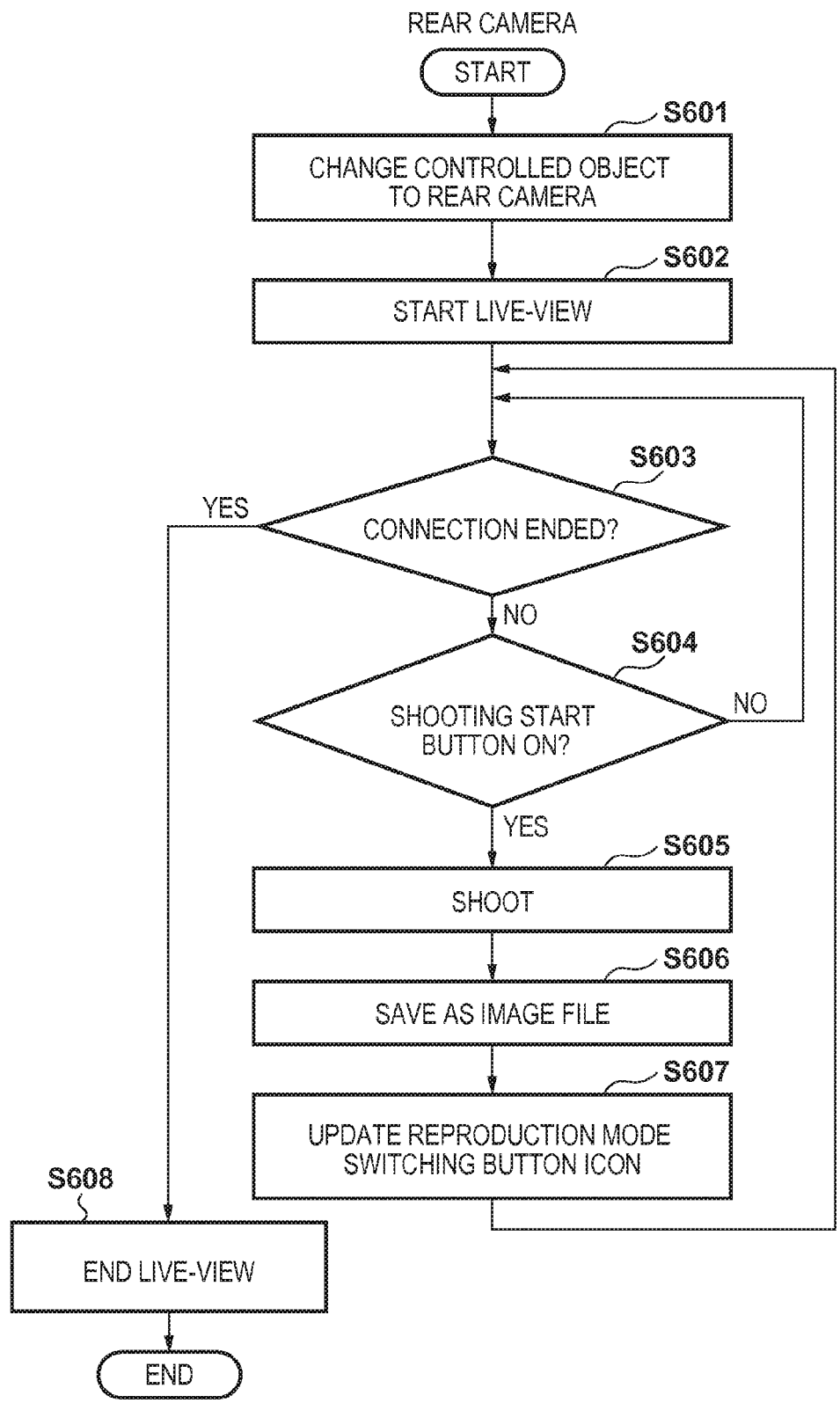
FIGS. 6A-6B are flowcharts showing shooting control processing by a camera application according to a first embodiment.

Note that the processing of FIG. 6A is started when the camera application of the smartphone 200 is activated.

In step S601, the system control unit 221 changes the controlled object camera icon 503 in the GUI screen 500 of FIG. 5A to the display of the rear camera.

In step S602, the system control unit 221 designates a display area of the live-view screen 508 and instructs the start of live view display of a video image obtained by the rear camera. This instruction allows the live-view screen 508 to be automatically updated to the live-view video image obtained by the rear camera.

In step S603, the system control unit 221 determines whether the shooting has ended or not. In the case where it is determined that the shooting has ended, the process advances to step S608, and the live view is ended. It is determined that shooting has ended when the application ends or the reproduction mode switching button 505 is operated.

In step S604, the system control unit 221 determines whether or not the shooting start button 506 has been operated. In the case where it has been operated, the process advances to step S605, and in the case where it has not, the process returns to step S603.

In step S605, the system control unit 221 outputs a shooting instruction to the rear camera and captures an image.

In step S606, the system control unit 221 saves the image obtained using image capture as an image file.

In step S607, the system control unit 221 updates the icon of the reproduction mode switching button 505 to the captured image.

By repeatedly executing the above processing, the shooting performed by the rear camera is realized.

Shooting Control of Remote Camera

Next, processing in which shooting is performed with the remote camera set as the controlled object in the camera application will be described with reference to FIG. 6B.

Figure 6B:
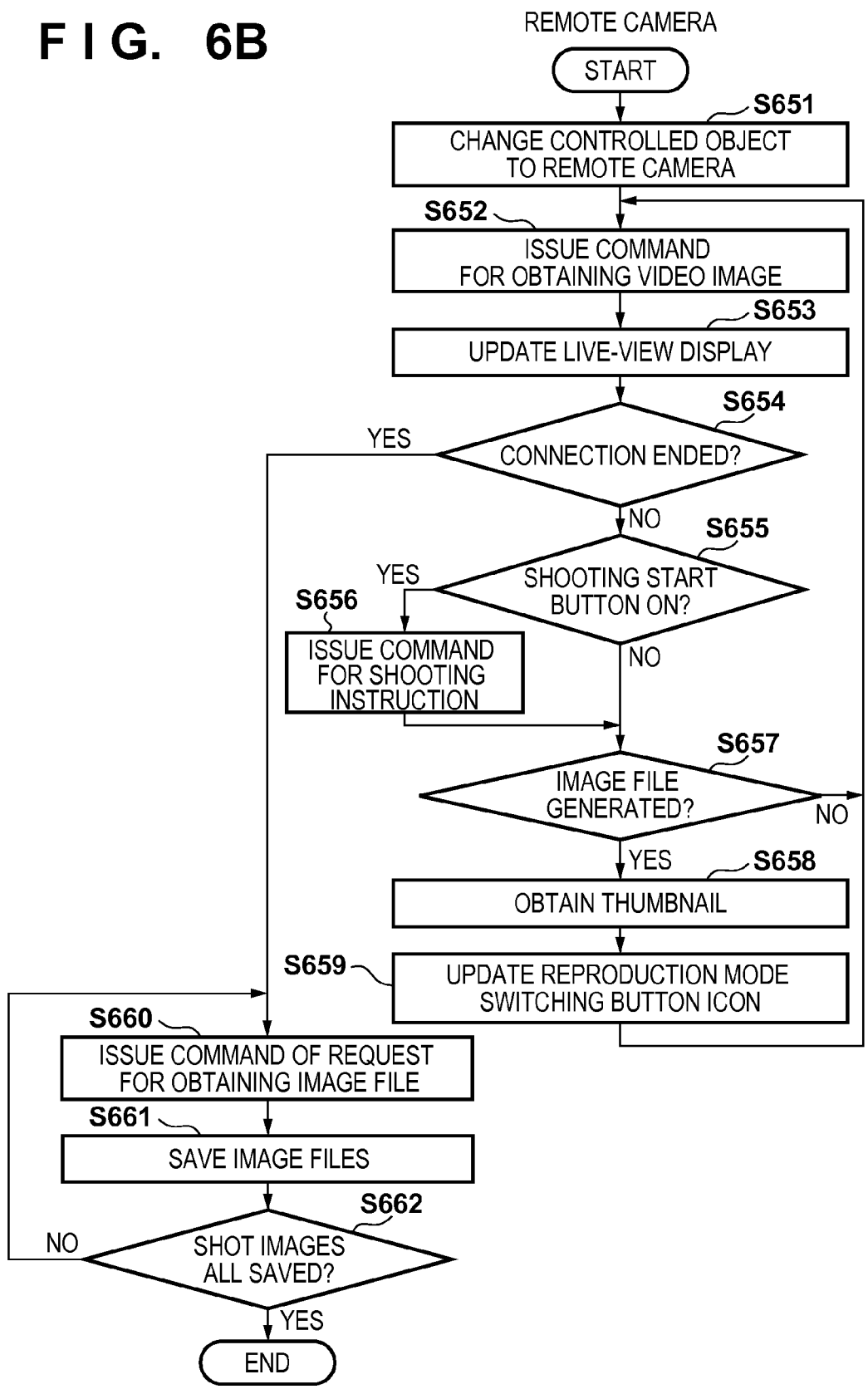

Note that the processing of FIG. 6B is started when connection with the remote camera is established through the procedures in FIGS. 4A to 4B and the camera application of the smartphone 200 is activated, or alternatively, when the connection with the remote camera that can communicate through the procedures in FIGS. 4A to 4B is established while the camera application is active with the rear camera set as the controlled object.

In step S651, the system control unit 221 changes the controlled object camera icon 503 in the GUI screen 500 of FIG. 5B to the display of the remote camera.

In step S652, the system control unit 221 issues a live-view video image request command to the remote camera so as to obtain a live-view video image.

In step S653, the system control unit 221 renders the live-view video image obtained from the remote camera on the display area of the live-view screen 508.

In step S654, the system control unit 221 determines whether the shooting has ended or not. In the case where it is determined that the shooting has ended, the process advances to step S660, and in the case where it is determined otherwise, the process advances to step S655. It is determined that shooting has ended when the application ends or the reproduction mode switching button 505 is operated.

In step S655, the system control unit 221 determines whether the shooting start button 506 has been operated. In the case where it has been operated, the process advances to step S656, and in the case where it has not, the process advances to step S657.

In step S656, the system control unit 221 issues a shooting instruction command to the rear camera.

In step S657, the system control unit 221 determines whether or not an image file has been generated from the image obtained using image capture. In this case, the determination can be made upon receiving an event from the remote camera. In the case where the determination is that the image file has been generated, the process advances to step S658, and in the case where it has not been generated, the process returns to step S652.

In step S658, the system control unit 221 obtains the thumbnail of the captured image from the remote camera.

In step S659, the system control unit 221 updates the icon of the reproduction mode switching button 505 to the thumbnail obtained from the remote camera.

By repeatedly executing the above processing, shooting using the remote camera is realized.

Note that in steps S655 to S659, obtaining/saving of the image file generated by the remote camera is not performed. This is because the image captured by the remote camera has high resolution and it takes time to acquire the original image file. Alternatively, this is because even in a case of transferring the file after reducing the file size by performing a resizing process or the like using the remote camera, it still takes time for the smartphone 200 to acquire it. If a time period during which shooting is not possible because of the image file transfer is created during shooting, there is a possibility that an interruption in shooting, in which a photo opportunity may be missed, or the like, will result.

In step S660, the system control unit 221 issues a command for obtaining the image file that was captured and generated by the remote camera, so as to obtain the image file. Here, the original image file may be acquired, or the image file that underwent a resizing process and so on by the remote camera may be acquired.

In step S661, the image file acquired from the remote camera is saved.

In step S662, the system control unit 221 repeats the processing from step S660 until all the image files are acquired.

In this manner, after it is determined that the shooting has ended, the image files are acquired from the remote camera.

As stated above, the camera application of the smartphone 200 of the present embodiment controls the rear camera built therein in the case where the connection with the remote camera is not established, whereas it automatically controls the remote camera in the case where the connection with the remote camera is established.

Second Embodiment

Next, a digital camera 100 and a camera application of a second embodiment will be described with reference to FIG. 7.

Figure 2:
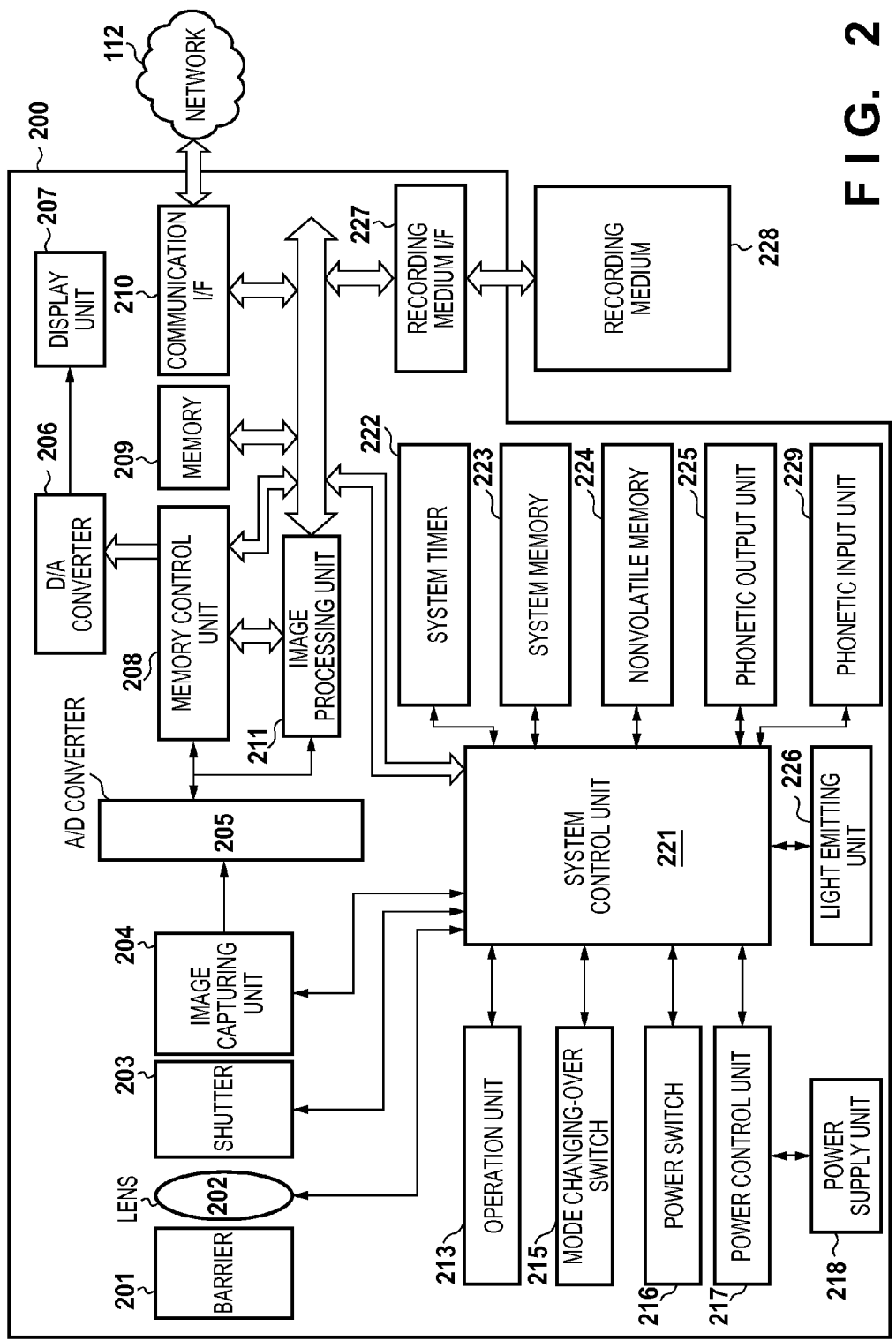
FIG. 2 is a block diagram showing a configuration of a smartphone according to a first embodiment.
Figure 7:
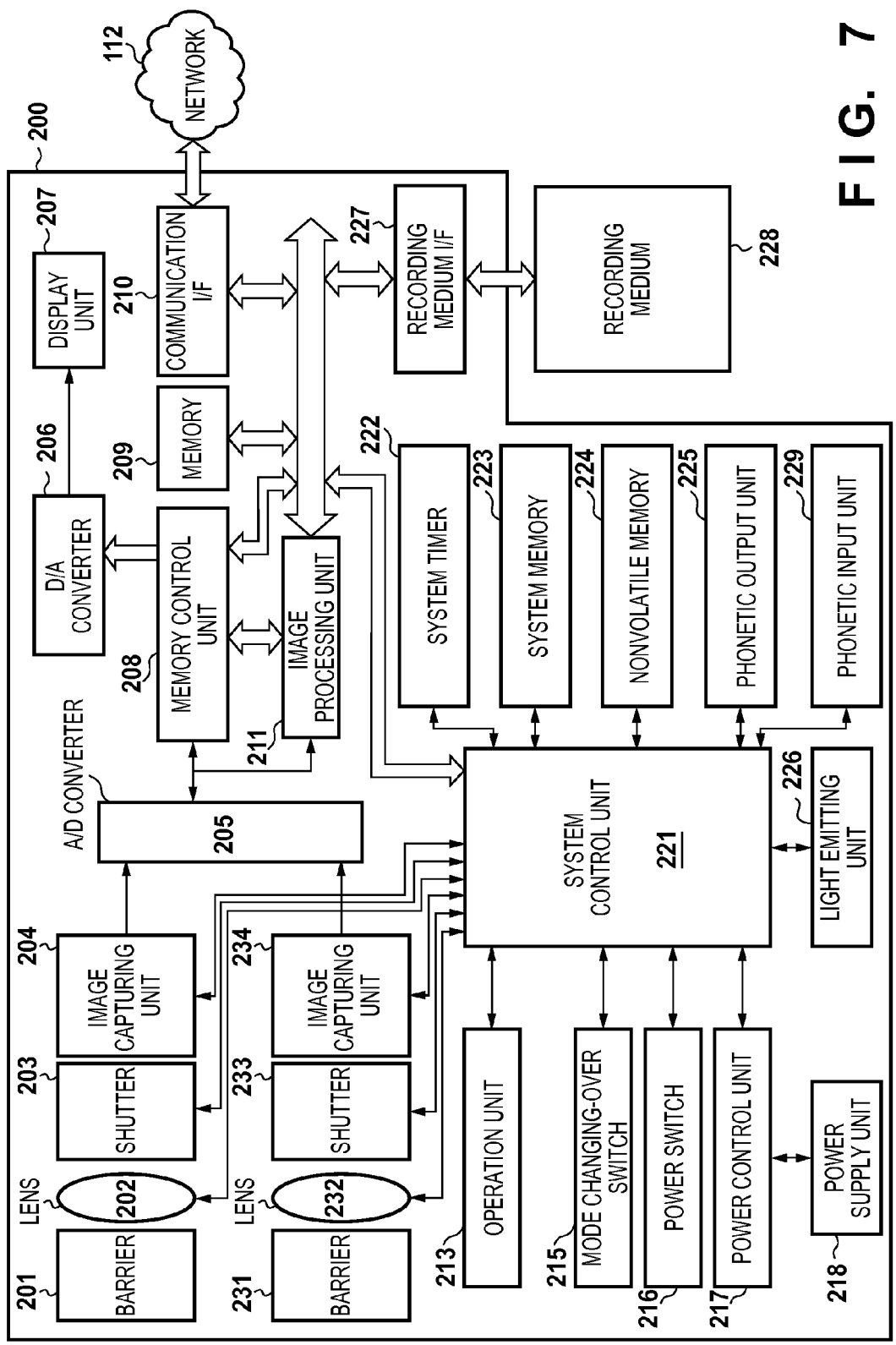
FIG. 7 is a block diagram showing a configuration of a smartphone according to a second embodiment.

FIG. 7 shows the configuration of a smartphone 200 according to the second embodiment, and the same configurations as in FIG. 2 are denoted by the same reference numerals.

Hereinafter, a description will be given with a focus on differences from the first embodiment.

Figure 3D:
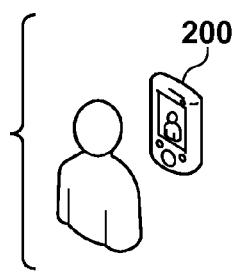

In addition to a rear camera module for shooting a subject that is visible to a photographer, a front camera module (referred to as "front camera" below) for shooting a photographer him- or herself and a subject on the photographer side is mounted on the smartphone 200 of the present embodiment. The rear camera includes a first image capturing system comprising a photographing lens 202, a shutter 203 and an image capturing unit 204, and the front camera includes a second image capturing system comprising a photographing lens 232, a shutter 233, and an image capturing unit 234. The rear camera is attached to the same casing surface as a display unit 207, and is mainly used to shoot the photographer him- or herself holding the smartphone 200 as shown in FIG. 3D.

The photographing lenses 202, 232 are groups of lenses including a zoom lens and a focusing lens. The shutters 203, 233 have a diaphragm function. The image capturing units 204, 234 are image sensors, which are constituted by a CCD or CMOS or the like, for converting the optical image of a subject to an electric signal.

An A/D converter 205 converts analog signals output from the image capturing units 204, 234 to digital signals. Barriers 201, 231 cover the image capturing system of the smartphone 200, which includes the photographing lenses 202, 232, thereby preventing contamination of and damage to the image capturing system including the photographing lenses 202, 232, the shutters 203, 233 and the image capturing units 204, 234.

Note that it is also possible to provide the A/D converter 205 and an image processing unit 211 for each of the image capturing units 204, 234.

Other configurations, being same as FIG. 2, will not be described.

In the present embodiment, it is possible to record a moving image and to shoot a still image with the same operation, using the smartphone 200 having the front camera mounted thereon in addition to the rear camera, while easily switching between the front camera and the rear camera.

Description of Camera Application

Next, the camera application activated by the smartphone 200 of the present embodiment will be described with reference to FIGS. 8A to 8D.

FIGS. 8A to 8D show the camera application screens of the smartphone 200. The same functions as in FIGS. 5A to 5B are denoted by the same reference signs and thus no description thereof will be made.

A camera switching button 801 is an operation unit imitating a physical switch that can switch between the front camera and the rear camera, and a user can switch a controlled object camera between the front camera and the rear camera by switching the camera switching button 801. The control screen of each camera can be switched to using a horizontal flick operation.

Figure 8A:
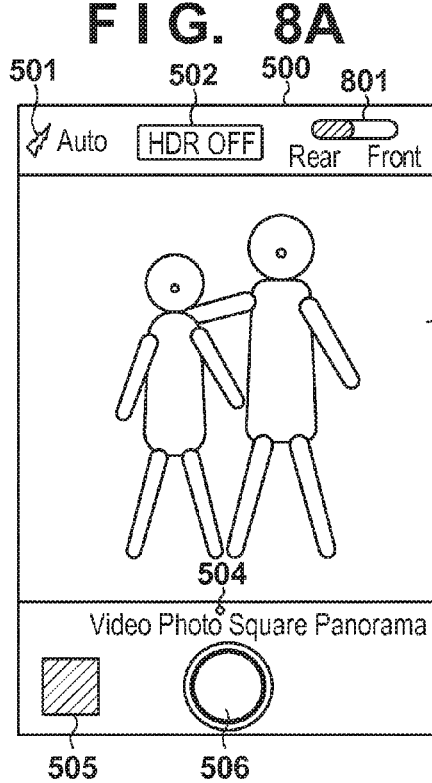
FIGS. 8A-8D are diagrams illustrating camera application screens of a smartphone according to a second embodiment.

FIG. 8A shows an application screen in which the rear camera serves as the controlled object in a state where no connection with the digital camera 100 has been made, and the state is also such that the camera switching button 801 is set to the rear camera.

Figure 8B:
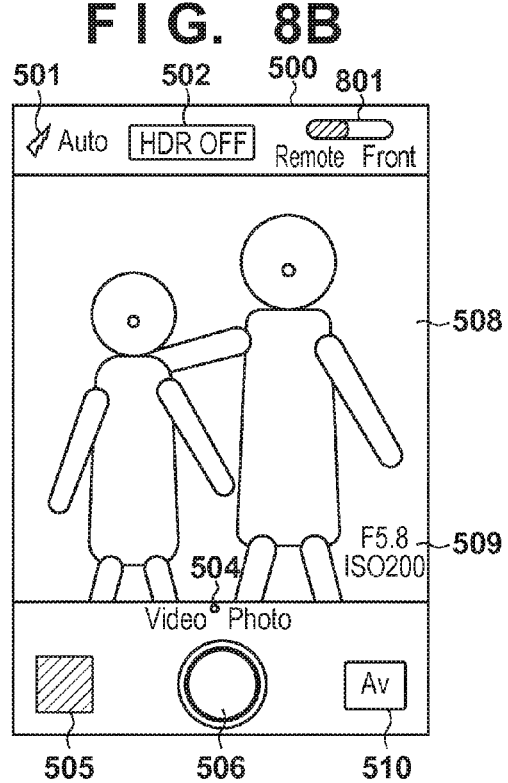

FIG. 8B shows an application screen in a case where connection with the digital camera 100 has been established from the state of FIG. 8A.

When connection with the remote camera that can communicate through the procedures of FIGS. 4A to 4B is established while the camera application is active with the rear camera of the smartphone 200 set as the controlled object as shown in FIG. 8A, a GUI screen 500 automatically changes from FIG. 8A to FIG. 8B, and the controlled object camera of the camera application is automatically switched to the remote camera. The shooting control of the remote camera is similar to that of FIG. 6B.

Figure 8C:
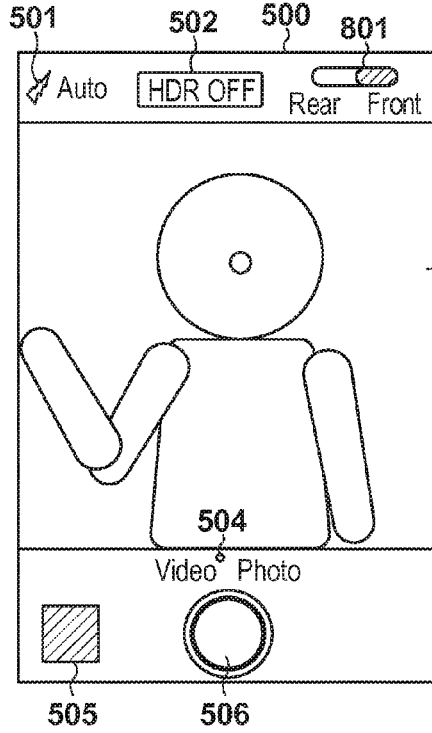

FIG. 8C shows an application screen in which the front camera serves as the controlled object in a state where no connection with the digital camera 100 has been made. When the camera switching button 801 of FIG. 8A is switched to "front camera", then the screen is changed to the GUI screen 500 of FIG. 8C. The shooting control of the front camera is similar to that of the rear camera of FIG. 6A with the front camera replacing the rear camera.

Figure 8D:
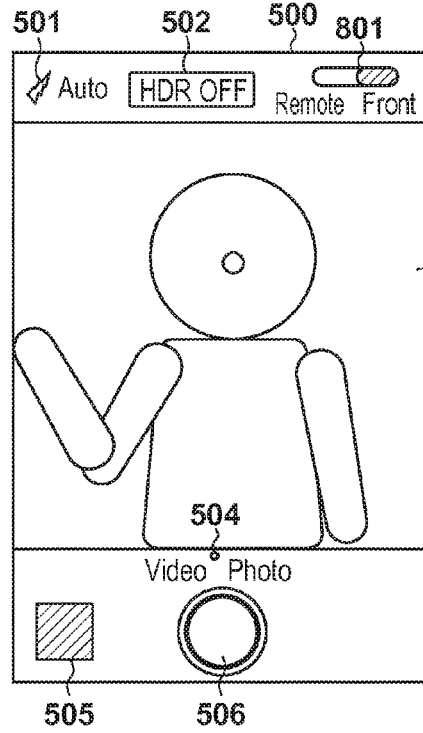

FIG. 8D shows an application screen in the case where connection with the digital camera 100 has been established from the state of FIG. 8C.

Even if connection with the remote camera that can communicate through the procedures of FIGS. 4A to 4B is established while the camera application is active with the front camera of the smartphone 200 set as the controlled object as shown in FIG. 8C, the shooting processing by the front camera continues. On the other hand, as shown in FIG. 8D, the camera switching button 801 changes to a switching button for switching between the remote camera and the front camera, and enters a state of being set to the front camera. When the camera switching button 801 of FIG. 8D is switched to the remote camera, the screen changes to the GUI screen of FIG. 8B. The shooting control of the remote camera is similar to that of FIG. 6B.

In this manner, in the case where connection with the remote camera is not established, the camera application of the smartphone 200 enables the switching to the rear camera or the front camera built in the smartphone 200 using the camera switching button 801. On the other hand, when connection with the remote camera is established, the switching to the remote camera or the front camera built in the smartphone 200 is enabled using the camera switching button 801.

Camera Control

Next, the control processing of a built-in camera (rear camera or front camera) and the remote camera by the camera application of the smartphone 200 of the present embodiment will be described.

Shooting Control of Front Camera

First, processing for shooting performed by the camera application with a built-in camera as the controlled object will be described with reference to FIGS. 9A and 9B.

Figure 9A:
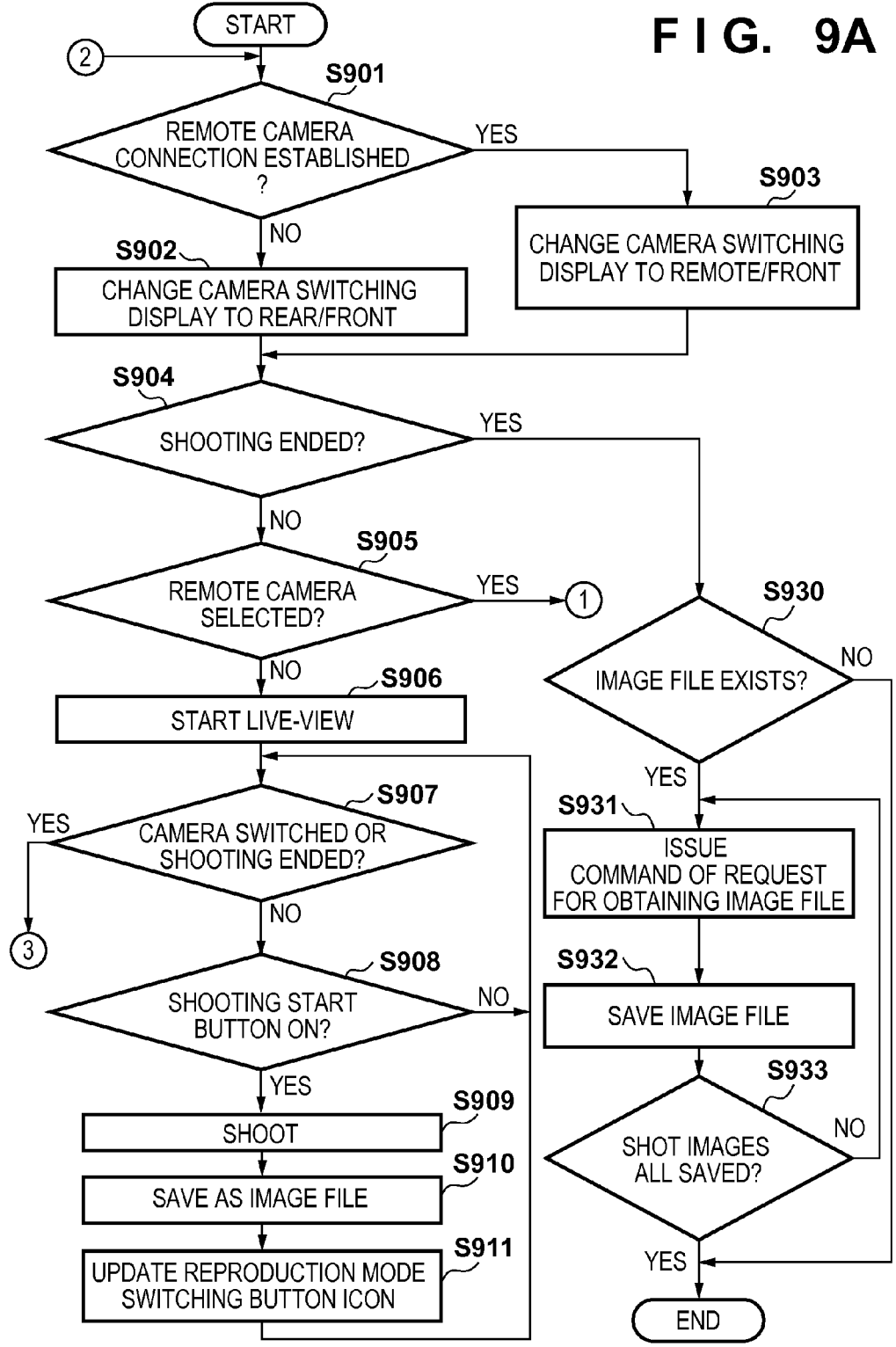
FIGS. 9A and 9B are flowcharts showing shooting control processing using a camera application according to a second embodiment.
Figure 9B:
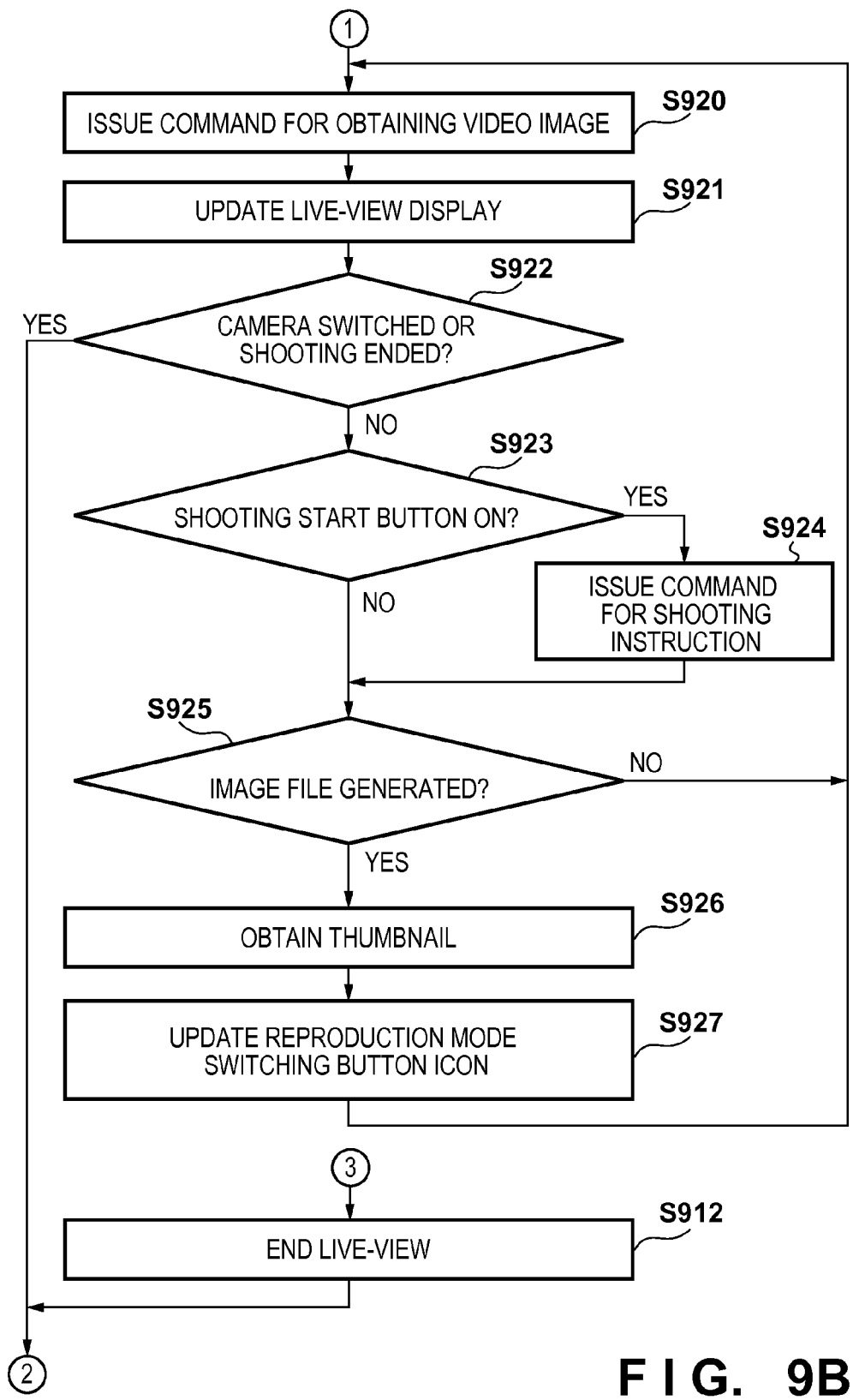

Note that processing of FIGS. 9A and 9B is started when the camera application of the smartphone 200 is activated.

In step S901 of FIG. 9A, the system control unit 221 determines whether or not connection with the remote camera has been established. In the case where the connection has been established, the process advances to step S903, and in the case where it is not, the process advances to step S902.

In step S902, the system control unit 221 changes the camera switching button 801 of the GUI screen 500 to a display for switching between "rear camera" and "front camera" as shown in FIG. 8A. In step S903, the system control unit 221 changes the camera switching button 801 of the GUI screen 500 to a switching display of "remote camera" and "front camera" as shown in FIG. 8B.

In step S904, the system control unit 221 determines whether shooting has ended or not. In the case where it is determined that shooting has ended, the process advances to step S930, and in the case where it is determined otherwise, the process advances to step S905. It is determined that shooting has ended when the application ends or the reproduction mode switching button 505 is operated.

In step S905, the system control unit 221 determines whether the remote camera has been selected using the camera switching button 801. In the case where the remote camera is selected, the process advances to step S920, and in the case where the front camera is selected, the process advances to step S906.

In step S906, the system control unit 221 designates a display area of the live-view screen 508 and instructs the start of a live view display of a video image obtained by the rear camera or the front camera, whichever was selected by the camera switching button 801. This instruction allows the live-view screen 508 to be automatically updated to the live-view video image obtained by the rear camera or the front camera.

In step S907, the system control unit 221 determines whether the operation of switching the cameras has been performed or whether shooting has ended. In the case where it is determined that the switching has been performed or the shooting has ended, the process advances to step S912, and the live view is ended. Here, the switching operation of the cameras also includes, in addition to the operation of the camera switching button 801, a case where connection with the remote camera is established while the rear camera is selected.

In step S908, the system control unit 221 determines whether the shooting start button 506 has been operated. In the case where it has been operated, the process advances to step S909, and in the case where it has not, the process returns to step S907.

In step S909, the system control unit 221 outputs a shooting instruction to the rear camera or the front camera and captures the image.

In step S910, the system control unit 221 saves the image obtained using image capture as an image file.

In step S911, the system control unit 221 updates the icon of the reproduction mode switching button 505 to the captured image.

By executing the above processing repeatedly, shooting using the rear camera or the front camera is realized.

Next, processing in which shooting is performed with the remote camera set as the controlled object in the camera application in steps S920 to S927 of FIG. 9B will be described.

In a case where the remote camera is selected in step S905, the system control unit 221 issues a live-view video image request command to the remote camera so as to obtain a live-view video image in step S920.

In step S921, the system control unit 221 renders the live-view video image obtained from the remote camera on the display area of the live-view screen 508.

In step S922, the system control unit 221 determines whether the switching operation of the cameras has been performed or shooting has ended. In the case where it is determined that the switching has been performed or the shooting has ended, the process returns to step S901.

In step S923, the system control unit 221 determines whether or not the shooting start button 506 has been operated. In the case where it has been operated, the process advances to step S924, and in the case where it has not, the process advances to step S925.

In step S924, the system control unit 221 issues a command for a shooting instruction to the remote camera.

In step S925, the system control unit 221 determines whether an image file has been generated from the image obtained using image capture. In this case, the determination can be made upon receiving an event from the remote camera. In the case where the determination is that the image file has been generated, the process advances to step S926, and in the case where it has not been generated, the process returns to step S920.

In step S926, the system control unit 221 obtains the thumbnail of the captured image from the remote camera.

In step S927, the system control unit 221 updates the icon of the reproduction mode switching button 505 to the thumbnail obtained from the remote camera.

By executing the above processing repeatedly, the shooting by the remote camera is realized.

In the case where it is determined in step S904 that shooting has ended, the process advances to step S930, and the system control unit 221 determines whether or not there is an image obtained by the remote camera. In the case where there is an image obtained by the remote camera, the process advances to step S931, and in the case where there is none, the processing is ended.

In step S931, the system control unit 221 issues a command requesting obtaining of the image file to the remote camera. The system control unit 221 then obtains the image file captured and generated by the remote camera. Here, the original image file may be acquired, or the image file that underwent resizing processing or the like using the remote camera may be acquired.

In step S932, the system control unit 221 saves the image file acquired from the remote camera.

In step S933, the system control unit 221 repeats the processing from step S931 until all the image files are acquired.

In this manner, after it is determined that the shooting has ended, the image files are acquired from the remote camera. Note that instead of acquiring the image files after the shooting has ended, they may be acquired gradually by dividing them between periods of obtaining the live-view video image in step S920.

Third Embodiment

The first and second embodiments as described above enable shooting to be performed suitably for different situations with regard to use cases shown in FIGS. 3A, 3B and 3D. However, as for a use case shown in FIG. 3C, it is possible that the above first and second embodiments do not allow shooting suitable for different situations to be performed. As for the use case shown in FIG. 3C, it is not usually the case that the smartphone 200 is carried with a camera unit 300 mounted thereon as the remote camera, and it is generally mounted only when performing shooting using the remote camera. However, the procedures in FIG. 4A to 4B require as long as 20 seconds until connection is established.

In the case where the user wishes to switch between the use cases of FIGS. 3A and 3D and the use case of FIG. 3C suitably for different shooting situations and the like, it is desirable that connection with the remote camera is established in advance and the controlled object of the camera application is automatically switched to "remote camera" when the remote camera is mounted on the smartphone 200.

In order to flexibly address such shooting situations, it is sufficient that remote camera is switched to when it is detected that the remote camera has been mounted on the smartphone 200, unlike the first and second embodiments in which establishment of connection is detected before switching to the remote camera.

Methods for detecting that the remote camera has been mounted on the smartphone 200 include, for example:

1. a method of determining a mounted state by detecting the proximity between the smartphone 200 and the remote camera using a Near Field Communication (NFC) interface;

2. a method of determining a mounted state by calculating the distance between the smartphone 200 and the remote camera device from the reception signal intensity of a wireless communication such as Bluetooth (registered) and a wireless LAN and determining whether they are closer than a threshold;

3. a method of determining a mounted state by analyzing the video image of the rear camera so as to detect that the video image of the rear camera is blocked due to the rear camera being obstructed by the mounted remote camera, that the video image of the rear camera is blocked due to the rear camera being obstructed by a hand of a photographer holding the casing of the smartphone 200 as a grip while mounting the remote camera, that the video image of when the remote camera is mounted appears on the video image of the rear camera, or the like;

4. a method of determining a mounted state by comparing the video image of the rear camera and the video image of the remote camera and determining whether the rear camera and the remote camera shot the same subject; and 5. a method of determining a mounted state by providing, on the remote camera side, a physical switch that detects that it is mounted to the smartphone 200, the switch indicating the mounted state when it is turned on.

By determining or detecting that the remote camera is mounted using the above-described methods and by switching the controlled object of the camera application to the remote camera, shooting suitable for different situations can be performed in the use case of FIG. 3C as well.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140864, filed Jul. 8, 2014 which is hereby incorporated by reference herein in its entirety.

What is claimed is:

1. A communication apparatus having a first image capturing device arranged on a first face and a second image capturing device arranged on a second face that is different from the first face, comprising:
   at least one processor;
   a communication interface configured to communicate with an external image capturing apparatus; and
   wherein in a case where communication with the external image capturing apparatus via the communication interface is not established, the at least one processor switches between a first mode in which an image is captured by controlling the first image capturing device and a second mode in which an image is captured by controlling the second image capturing device, and
   in a case where communication with the external image capturing apparatus via the communication interface is established, the at least one processor switches between the first mode and a third mode in which an image is captured by remotely controlling the external image capturing apparatus.

2. The apparatus according to claim 1, wherein
   in a case where communication with the external image capturing apparatus via the communication interface is established, the at least one processor automatically switches a controlled object from the first image capturing device to the external image capturing apparatus, and
   wherein the at least one processor is configured to display the image captured by the external image capturing apparatus on a display device.

3. The apparatus according to claim 2, wherein
   in a case where communication with the external image capturing apparatus via the communication interface is established and in a case where the controlled object is the second image capturing device, the at least one processor does not switch the controlled object, and
   the at least one processor displays a unit for switching the controlled object from the second image capturing device unit to the external image capturing apparatus on the display device.

4. The apparatus according to claim 1, wherein
   the external image capturing apparatus has a function that the first and second image capturing device do not have, and includes an external device that can be mounted on the communication apparatus.

5. The apparatus according to claim 4,
   wherein the processor is configured to determine whether or not the external device is mounted on the communication apparatus.

6. The apparatus according to claim 5, wherein
   the at least one processor determines whether the external device is mounted on the communication apparatus according to a result of detecting proximity of the communication apparatus and the external image capturing apparatus using wireless communication based on a Near Field Communication.

7. The apparatus according to claim 5, wherein
   the at least one processor determines that the external device is mounted on the communication apparatus in a case where a signal intensity received via the communication interface is greater than a threshold.

8. The apparatus according to claim 5, wherein
   the at least one processor determines whether the external device is mounted on the communication apparatus according to a result of analyzing the image obtained by the first image capturing device.

9. The apparatus according to claim 5, wherein
   the determining unit determines whether the external device is mounted on the communication apparatus according to a result of comparing the image obtained by the first image capturing device to the image obtained from the external image capturing apparatus.

10. The apparatus according to claim 1, wherein the communication apparatus is a smart phone.

11. The apparatus according to claim 1, wherein the communication apparatus is a tablet device.

12. The apparatus according to claim 1, wherein the communication apparatus is a mobile media player.

13. The apparatus according to claim 1, wherein the external image capturing apparatus is a smart phone.

14. The apparatus according to claim 1, wherein the external image capturing apparatus is a tablet device.

15. A control method of a communication apparatus comprising a first image capturing device arranged on a first face, and a second image capturing device arranged on a second face that is different from the first face, the method comprising:

a communication step of communicating with an external image capturing apparatus; and a switching step of switching an image capturing mode, wherein in the switching step, switching between a first mode for capturing an image by controlling the first image capturing device and a second mode for capturing an image by controlling the second image capturing device is performed in a case where communication with the external image capturing apparatus is not established, and switching between the first mode and a third mode for capturing an image by remotely controlling the external image capturing apparatus is performed in a case where communication with the external image capturing apparatus is established.

16. A non-transitory computer-readable storage medium storing a program for causing a computer to execute the control method of a communication apparatus comprising a first image capturing device arranged on a first face, and a second image capturing device arranged on a second face that is different from the first face, the method comprising:

a communication step of communicating with an external image capturing apparatus; and a switching step of switching an image capturing mode, wherein in the switching step, switching between a first mode for capturing an image by controlling the first image capturing device and a second mode for capturing an image by controlling the second image capturing device is performed in a case where communication with the external image capturing apparatus is not established, and switching between the first mode and a third mode for capturing an image by remotely controlling the external image capturing apparatus is performed in a case where communication with the external image capturing apparatus is established.

* * * * *